(12) United States Patent
Moake

(10) Patent No.: US 10,209,394 B2
(45) Date of Patent: Feb. 19, 2019

(54) MULTI-TOOL ANALYSIS OF ANNULUSES IN CASED HOLES

(71) Applicant: Halliburton Energy Services, Inc., Houston, TX (US)

(72) Inventor: Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 96 days.

(21) Appl. No.: 15/119,369

(22) PCT Filed: Sep. 14, 2015

(86) PCT No.: PCT/US2015/050009
§ 371 (c)(1),
(2) Date: Aug. 16, 2016

(87) PCT Pub. No.: WO2017/048225
PCT Pub. Date: Mar. 23, 2017

(65) Prior Publication Data
US 2017/0261638 A1 Sep. 14, 2017

(51) Int. Cl.
G01V 5/00 (2006.01)
G01V 5/12 (2006.01)
E21B 29/00 (2006.01)
E21B 47/00 (2012.01)
E21B 47/09 (2012.01)
G01V 5/10 (2006.01)
E21B 47/16 (2006.01)
E21B 49/00 (2006.01)

(52) U.S. Cl.
CPC ............... $G01V$ 5/12 (2013.01); $E21B$ 29/00 (2013.01); $E21B$ 47/00 (2013.01); $E21B$ 47/0005 (2013.01); $E21B$ 47/09 (2013.01); $E21B$ 47/16 (2013.01); $E21B$ 49/00 (2013.01); $G01V$ 5/104 (2013.01)

(58) Field of Classification Search
None
See application file for complete search history.

(56) References Cited

U.S. PATENT DOCUMENTS

2008/0156494 A1* 7/2008 Abadie ............... E21B 29/00
166/298
2011/0238312 A1 9/2011 Seydoux et al.
2012/0166086 A1 6/2012 Zhong et al.
2013/0009049 A1* 1/2013 Smaardyk ............ E21B 43/04
250/269.3
2013/0261974 A1 10/2013 Stewart et al.
(Continued)

FOREIGN PATENT DOCUMENTS

WO 2011127156 10/2011

OTHER PUBLICATIONS

International Search Report and Written Opinion of PCT Application No. PCT/US2015/050009 dated May 25, 2016: pp. 1-14.

Primary Examiner — Yara B Green
(74) Attorney, Agent, or Firm — Chamberlain Hrdlicka

(57) ABSTRACT

A method for determining a material in an annulus between two objects disposed in a borehole includes positioning logging tools in the borehole, each of the logging tools being oriented at a different angle. The method also includes measuring a property of the material in the annulus using the logging tools and determining the material in the annulus based on the measured property.

19 Claims, 10 Drawing Sheets

(56) References Cited

U.S. PATENT DOCUMENTS

2013/0292188 A1* 11/2013 Bilen .................. E21B 10/5676
  175/428
2014/0090846 A1   4/2014 Deutch et al.

* cited by examiner

MULTI-TOOL ANALYSIS OF ANNULUSES IN CASED HOLES

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Logging tools are used in the oil and gas industry to determine properties of an earth formation surrounding a borehole. Logging tools may use a number of different techniques to obtain measurements of the formation surrounding the borehole. The measurements may then be used to evaluate formation properties such as porosity, saturation, density, resistivity, salinity, among others, as well as geologic characteristics such as structural dip and heterogeneities.

BRIEF DESCRIPTION OF THE DRAWINGS

For a detailed description of the embodiments of the invention, reference will now be made to the accompanying drawings in which.

DETAILED DESCRIPTION

Figure 1A:
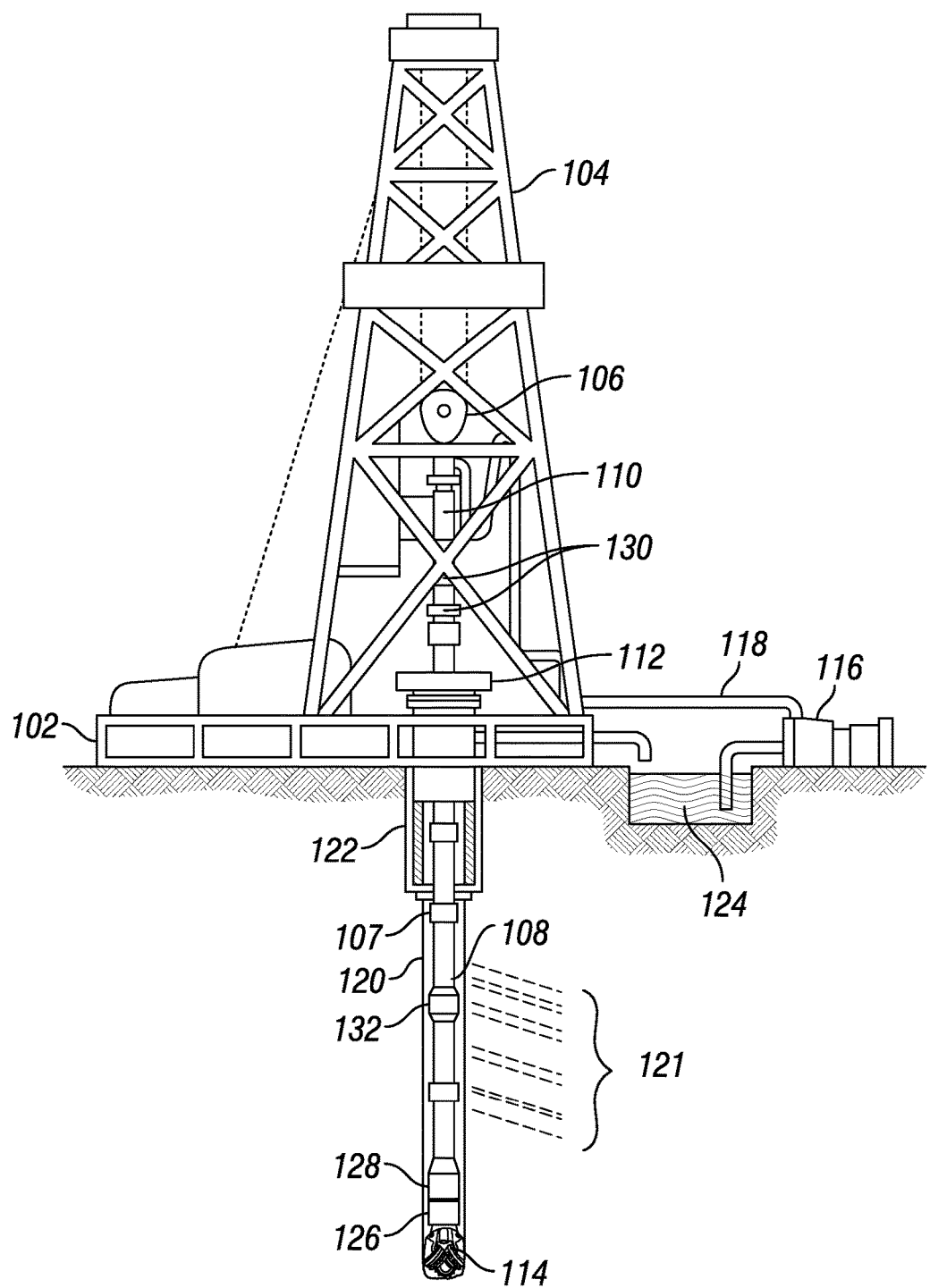
FIGS. 1A and 1B depict illustrative oilfield environments in accordance with one or more embodiments.

When drilling a well and/or in production and completion thereof, an open hole may be lined with pipes for stability and to protect the borehole from contaminants. One or more pipes may be coupled together to form a casing string or "casing." Although one casing may be used, multiple casings may be positioned within a borehole, a borehole may be partially cased, and/or a borehole may not have any casing. Casing may be hung from one or more casing hangers and may be hung at one or more locations along the length of the borehole. The locations in which a casing string is hung may be determined in advance and may be based on casing, borehole, and formation properties, among other factors.

To install a casing, cement may be pumped through the casing and into the borehole surrounding the casing. The casing and cementing process may be done in stages in which a borehole is drilled to a particular depth, then cased and cemented. Thereafter, the borehole may be drilled to a second, deeper depth, then cased and cemented. When lining a borehole with one or more casing strings, annuluses are formed between an outer casing string and the borehole wall and between two casing strings (e.g., when one casing string is partially or wholly located within another casing string). Portions of the borehole where one or more casing strings are positioned may be referred to as a cased hole.

When performing logging operations in a cased hole, measurements obtained by the logging tool may be affected by one or more casings located between the logging tool and the borehole wall. While tools optimized for cased holes may be used, tools used in an open-hole environment (i.e., non-cased boreholes) may be used as an alternative to obtain measurements and properties of the formation surrounding the borehole as well as other properties of materials within the borehole.

In some instances, it may be beneficial to evaluate properties of material in one or more annuluses of a borehole. For example, when a well undergoes abandonment (e.g., when reservoir resources have been depleted), one or more casing strings may be removed from the borehole. In this scenario, casing may be cut at a particular location or depth and then pulled out of the borehole. As the rig has a limit on how much force can be used to pull out the casing, some abandonment processes may include cutting a first section of casing, pulling out the first section, cutting a second section of casing, and pulling out the second section. This may be repeated for multiple sections until a certain amount of casing is removed from the borehole. The amount of casing to be removed may depend on the borehole width and length, casing properties, standard operating procedures, as well as local, national, and international regulations, among other factors.

Optimizing the abandonment process may involve removing as much casing as possible with each run. Based on the rig capabilities, an optimum location to cut one or more casing strings may be computed. When computing the optimum location to cut, it may be helpful to better understand the material and material properties in annuluses in the borehole. Although casings may be cemented into place, cement may only be located about a portion of the casing. In other portions, cement may have deteriorated, or materials such as drilling mud, formation deposits, or other materials may reside.

Accordingly various tools, systems, and methods are disclosed to determine one or more properties or quantities indicative of one or more properties of material in an oilfield environment. One or more of the embodiments include one or more tools or tool components. The tool may be positioned within a borehole extending into a well to obtain measurements of the borehole and/or formation around the tool. The measurements may then be used to determine borehole properties, properties of material in the borehole, and/or formation properties of a region surrounding the tool. In one or more embodiments, the measurements may be used to determine a property of a casing string located between the tool and the borehole wall and/or the measurements may be used to determine a property of a material within an annulus between two casing strings and/or between a casing string and the borehole wall. Materials in an annulus within a borehole may include cement, drilling mud, formation deposits, water, or other material known in the art. The measurements may also be used to determine formation properties such as resistivity, porosity, lithology, among others and/or may be used to determine borehole properties such as borehole size, shape, and depth, among many others.

Turning now to the present figures, FIG. 1A depicts an example oilfield environment in accordance with one or more embodiments. A drilling platform 102 is equipped with a derrick 104 that supports a hoist 106 for raising and lowering a drill string 108. The hoist 106 suspends a top drive 110 that rotates the drill string 108 as the drill string is lowered through the well head 112. Sections of the drill string 108 are connected by threaded connectors 107. Connected to the lower end of the drill string 108 is a drill bit 114. As bit 114 rotates, a borehole 120 is created that passes through various formations 121 within a reservoir.

As shown, casing 122 is installed within the borehole 120 and extends at least partially along a length of the borehole 120. In one or more embodiments, multiple casings may be located within the borehole 120 and one or more casings may extend within a portion of or the entirety of another casing, such as casing 122. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole 120 into the pit 124 and aids in maintaining the integrity of the borehole 120.

Downhole sensors (including tool 126) are coupled to a telemetry module 128 having a transmitter (e.g., acoustic telemetry transmitter) that transmits signals in the form of acoustic vibrations in the tubing wall of drill string 108. A receiver array 130 may be coupled to tubing below the top drive 110 to receive transmitted signals. One or more repeater modules 132 may be optionally provided along the drill string to receive and retransmit the telemetry signals. Of course, other telemetry techniques can be employed including mud pulse telemetry, electromagnetic telemetry, and wired drill pipe telemetry. Many telemetry techniques also offer the ability to transfer commands from the surface to the tool, thereby enabling adjustment of tool configuration and operating parameters. In some embodiments, the telemetry module 128 also or alternatively stores measurements for later retrieval when the tool 126 returns to the surface.

In one or more embodiments, the tool 126 may be integrated into the bottom-hole assembly near the bit 114. The tool 126 may take the form of a drill collar, i.e., a thick-walled tubular that provides weight and rigidity to aid the drilling process. As the bit extends the borehole 120 through the formations 121, the tool 126 collects measurements of the borehole 120, casing 122 and any annuluses surrounding casing 122, and formations 121 around the tool 126, as well as measurements of the tool orientation and position, drilling fluid properties, and various other drilling conditions. In one or more embodiments, the tool 126 may be a logging tool, an induction tool, a density tool, or any other tool or combination of tools known to those of skill in the art.

After obtaining measurements, the tool 126 or facility (such as logging facility 144 in FIG. 1B) may be configured to analyze the measurements of the borehole 120, casing 122 and any annuluses surrounding casing 122, and formations 121 around the tool 126 in order to determine an arrangement of the casing 122. For example, measurements may be analyzed to determine if an annulus between the casing 122 and another casing or wall of the borehole 120 varies in thickness along the length of the casing 122. Measurements may be analyzed to determine if an annulus or multiple annuluses between multiple casings vary about an azimuth of the borehole 120. The azimuth may be defined with respect to a vertical cross-section of the borehole 120. Such an arrangement may be considered non-concentric casing arrangement.

Figure 1B:
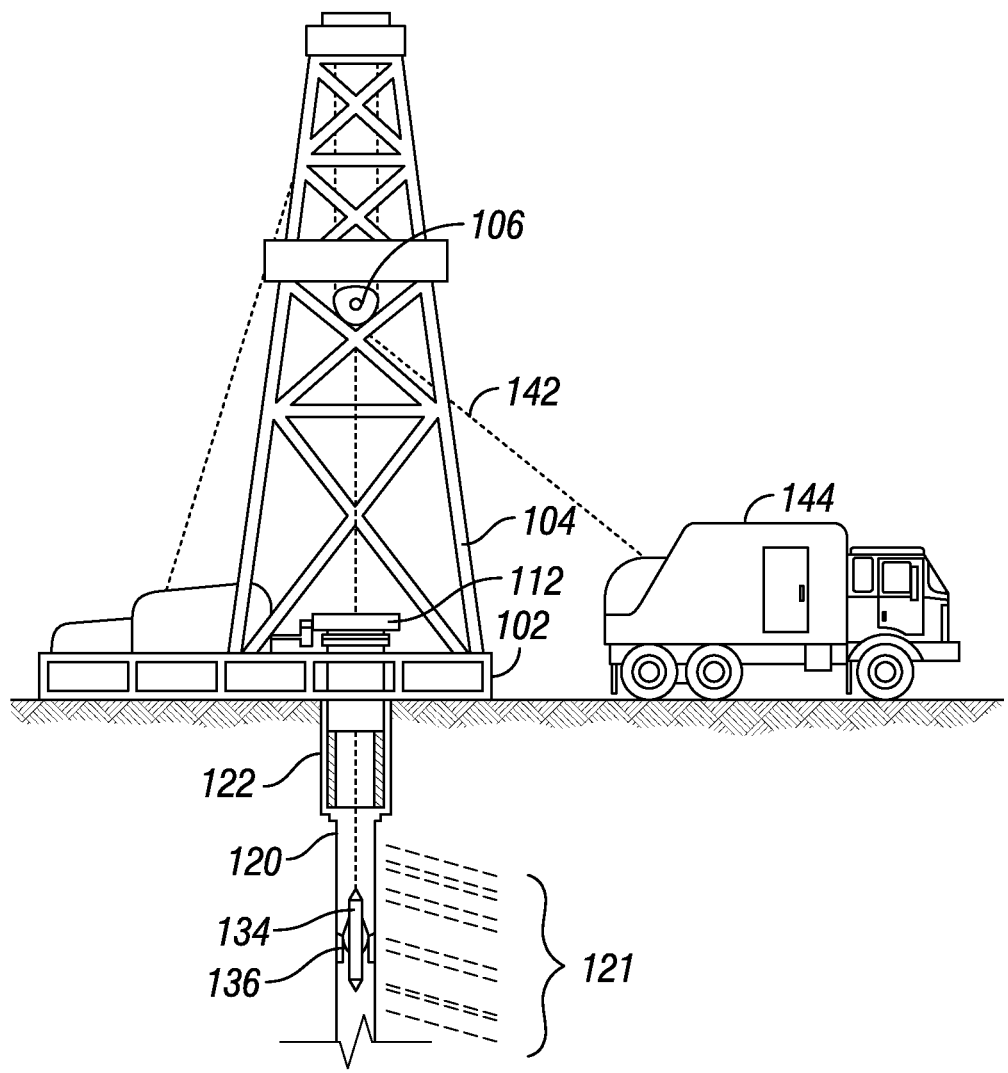

At various times during the drilling process, the tool 126 may perform logging or measurement operations as a so-called logging-while-drilling ("LWD") or measurement-while-drilling ("MWD") tool. At other times, the drill string 108 may be removed from the borehole and logging operations may be conducted as shown in FIG. 1B, where a logging tool 134 is suspended by a cable 142 (e.g., a slickline, a wireline, a braided cable etc.). While a cable is shown, it should be understood that logging tool 134 could be conveyed into the borehole 120 with other types of conveyance such as coiled tubing, a downhole tractor, rigid pipe (e.g., jointed tubulars), or the like. The cable 142 may include conductors for transporting power to the tool 134 and telemetry from the tool 134 to the surface. Centralizers may be used to center or position the tool 134 in the borehole 120. Centralizers may include collars, rings, housings, or other centralizing devices, such as centralizing arms 136, as shown. A logging facility 144 collects measurements from the logging tool 134, and includes computing facilities for processing and storing the measurements gathered by the logging tool 134.

Figure 2A:
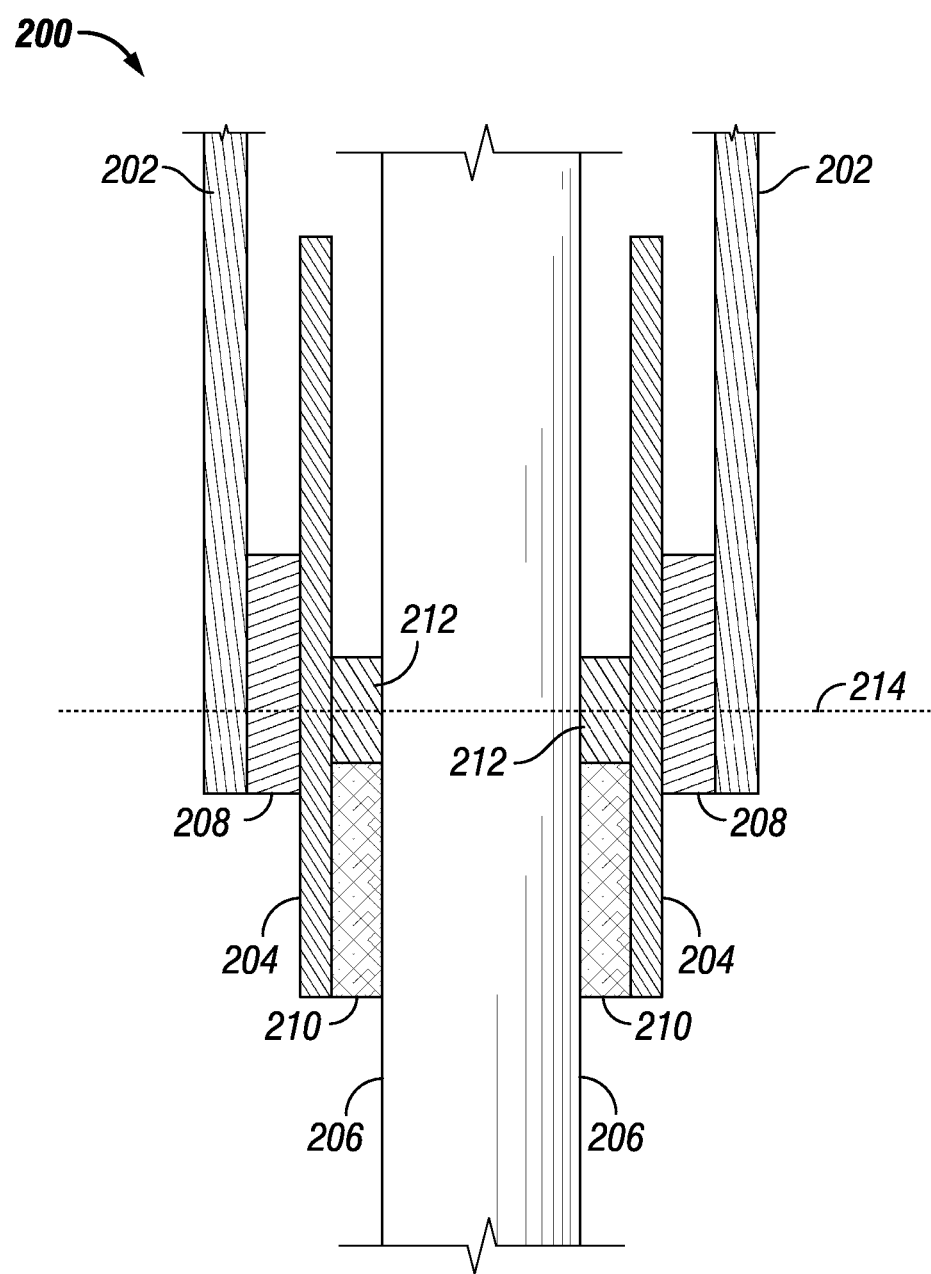
FIG. 2A depicts a cross sectional view of a cased borehole in accordance with one or more embodiments.

FIG. 2A depicts a cross sectional view of a borehole 200, according to one or more embodiments, that may represent the borehole 120 of FIGS. 1A and 1B. The borehole 200 includes an outer casing 202, a middle casing 204, and an inner casing 206. In one or more embodiments, the outer casing 202 may be conductor pipe or surface casing and may extend from a borehole surface along a portion of a length of the borehole 200, as shown. In other embodiments, the outer casing 202 may be any casing between the inner casing 206 and a wall of the borehole 200. The outer casing 202 may be hung from a casing hanger (not shown) located at or near the surface of the borehole 200 or at any other location along the length of the borehole 200.

The middle casing 204 may be surface casing or any other intermediate casing between the outer casing 202 and the inner casing 206. The middle casing 204 may extend along a portion or entirety of the borehole 200 or may extend from a surface along a given length of the borehole 200. The middle casing 204 may be hung from a casing hanger (not shown) and may be cemented into place by cement 208 disposed between the middle casing 204 and the outer casing 206. It should be understood that the cement 208 may be located along a majority of the length of middle casing 204 and may extend between the middle casing 204 and a wall of the borehole 200.

The inner casing 206 may be production casing or tubing or any other innermost casing with respect to other casings in the borehole 200. The inner casing 206 may extend along a majority of the length of the borehole 200 from any location along the length of the borehole, as shown, or may extend along a portion of the length of the borehole 200 from the borehole surface or any other location. The inner casing 206 may be cemented into place by cement 210 disposed between the inner casing 206 and the middle casing 204. Similar to the above, the cement 210 may be disposed along a majority of the length of inner casing 206 and may extend between the inner casing 206 and the wall of the borehole 200.

As above, in some scenarios, a material other than cement or combination of materials may reside in an annulus between two or more casing strings or between a casing string and the wall of the borehole 200. In FIG. 2A, a material 212 is located between inner casing 206 and middle casing 204. The material 212 may include barite mud, water, injection fluid, formation deposits, cement remnants, or combinations of the foregoing, among others, as known by those of skill in the art.

Figure 2B:
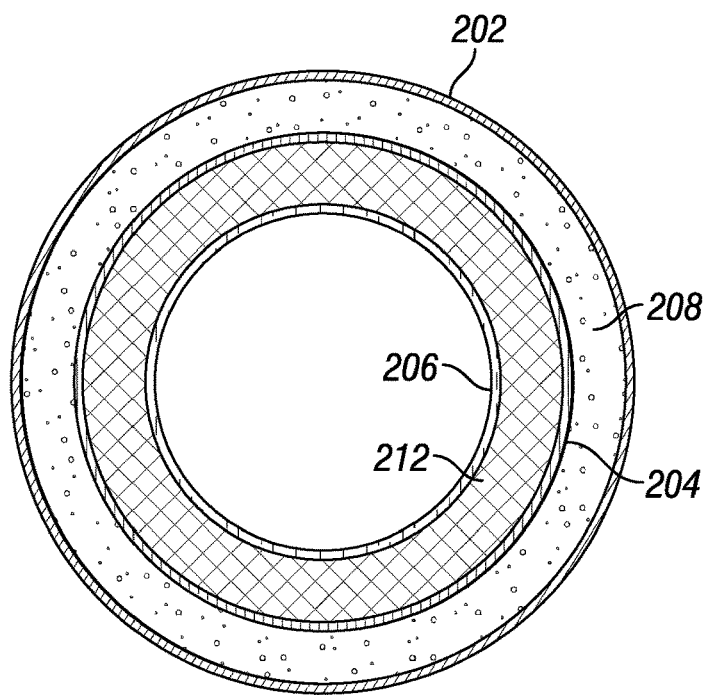
FIG. 2B depicts a cross sectional view of a cased borehole in accordance with one or more embodiments.

FIG. 2B depicts a cross sectional view of the cased borehole 200 along axis 214 (as shown in FIG. 2A), in accordance with one or more embodiments. In FIG. 2B, outer casing 202 surrounds middle casing 204 and inner casing 206. An annulus formed between outer casing 202 and middle casing 204 includes cement 208 and an annulus formed between middle casing 204 and inner casing 206 includes material 212. In FIG. 2B, outer casing 202, middle casing 204, and inner casing 206 are concentric, where each casing is centered axially along the borehole 200. In such an arrangement, one or more annuluses may have uniform thickness along the length of the borehole 200 and/or about an azimuth of the borehole 200 (e.g., the radial thickness of the annulus may be the same or similar azimuthally about the cross-section of the borehole 200).

In some instances, the arrangement of the casings may be non-concentric, where an annulus between two objects (e.g., outer casing 202 and middle casing 204) disposed in the borehole 200 varies in thickness along the length of the borehole 200 and/or about the azimuth of the borehole 200 (e.g., the radial thickness of the annulus may vary azimuthally about the cross-section of the borehole 200). As will be appreciated, other arrangements and configurations of casings may be considered without departing from the scope of the present disclosure.

In one or more embodiments, it may be helpful to better understand properties of any material residing in an annulus between two objects disposed in a borehole (e.g., between two casings or between a casing and a borehole wall). Properties of a material residing in an annulus between casings may include composition (e.g., chemical composition), density, viscosity, pH, porosity, resistivity, dielectric constant, capture cross section, permeability, and alkalinity, among others.

As an example, an open-hole density tool may be positioned within the borehole and used to measure and/or analyze one or more properties of a material in an annulus between two objects disposed in the borehole. An open-hole density tool may include a radioactive source and one or more detectors. The radioactive source may be configured to emit gamma rays that disperse radially from the tool through the casing (and any other materials in the borehole) and into the formation surrounding the borehole. The atoms of the casing, formation, and/or other materials may absorb energy from some of the emitted gamma rays and lower energy gamma rays may be reflected back toward the tool. A measurement of the number of gamma rays that return to the one or more detectors may be obtained by the tool and used to determine one or more properties, such as formation properties, casing properties, and other properties of materials within the borehole or around the tool. The measurement obtained using this technique may be referred to as the count rate. Multiple count rates corresponding to different ranges of energy that are transmitted by the tool and received by a detector may be measured. Other measurements may include ratios of count rates, among others. Although an open-hole density tool is described herein, other tools such as pulsed or compensated neutron tools, gamma ray tools, spontaneous potential tools, resistivity tools, and induction tools, among many others, may be used without departing from the scope of the present disclosure.

Although the open-hole density tool may be designed for use in a non-cased borehole, if the casing strings are concentric, as illustrated in FIG. 2B, an interpretation of measurements obtained using an open-hole density tool in a cased hole environment may be used to determine one or more properties, such as formation properties as well as properties of material within an annulus between two objects disposed in a borehole.

For example, in one or more embodiments, count rates obtained in a concentric cased hole may be plotted versus tool depth to provide a log of how the count rate changes versus depth. Analyzing the log may provide an indication of how properties between casings change along a portion of a length of the borehole. For instance, if the measured count rates show a sudden increase when logging through a zone thought to contain cement, it may be indicative of a decrease in annular density, which could be interpreted as the cement being replaced by a lower-density fluid. In this case, the count rate may be used to determine and/or provide a qualitative measure of a property.

In other embodiments, if the arrangement of one or more casings in a borehole is known, it may be advantageous to quantitatively calculate a property of the material based on a measured count rate. For example, density of a material may be computed from one of the following equations:

$$\rho = a + b \ln(C) \quad (1)$$

$$\rho = a + b[\ln(C_1) + d \ln(C_2)] \quad (2)$$

where a, b, and d are parameters that may depend on the arrangement of casings and casing properties within a borehole and C, $C_1$, and $C_2$ are count rates, $C_1$ and $C_2$ being count rates of different energies.

In one or more embodiments, for example, a property that may indicate the content of barite in a material within an annulus between two objects disposed in a borehole may be computed. Barite is often associated with drilling mud, and when present, barite can settle and pack in around casing. The packed barite can provide a large frictional force that opposes removal of the casing. A barite indicator may be obtained from a high-energy count rate and a low energy count rate. Both count rates are sensitive to Compton scattering and photoelectric absorption, but may be combined to obtain a quantity that is primarily sensitive to photoelectric absorption. As barite may have a larger photoelectric absorption when compared to other material potentially found in the borehole, the resultant quantity may be used as an indicator of the presence of barite. A ratio of high-energy count rate to low-energy count rate may be used to obtain a resultant quantity to be used as an indicator of a specific material. Other ratios of different energy count rates may also be used as an indicator of a specific material.

Some open-hole density tools are directional in that measurements may be obtained in only one direction (e.g., radially at a specific azimuth). In addition, tool response and measurements using an open-hole tool may be affected if a casing arrangement within a borehole is not concentric. For example, if the casing arrangement is not concentric, the count rates measured by an open-hole density tool may be different than the count rates measured by the same tool with the same materials in an annulus between two objects disposed in the borehole, but in a concentric casing arrangement.

Figure 3A:
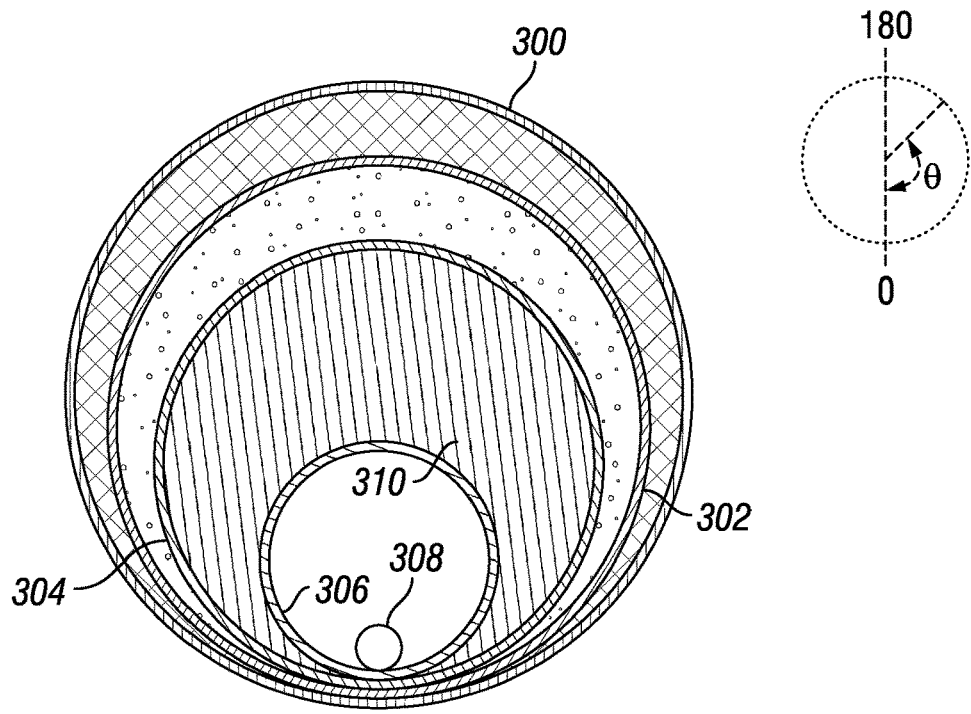
FIGS. 3A and 3B depict cross sectional views of concentric and non-concentric cased boreholes in accordance with one or more embodiments.
Figure 3B:
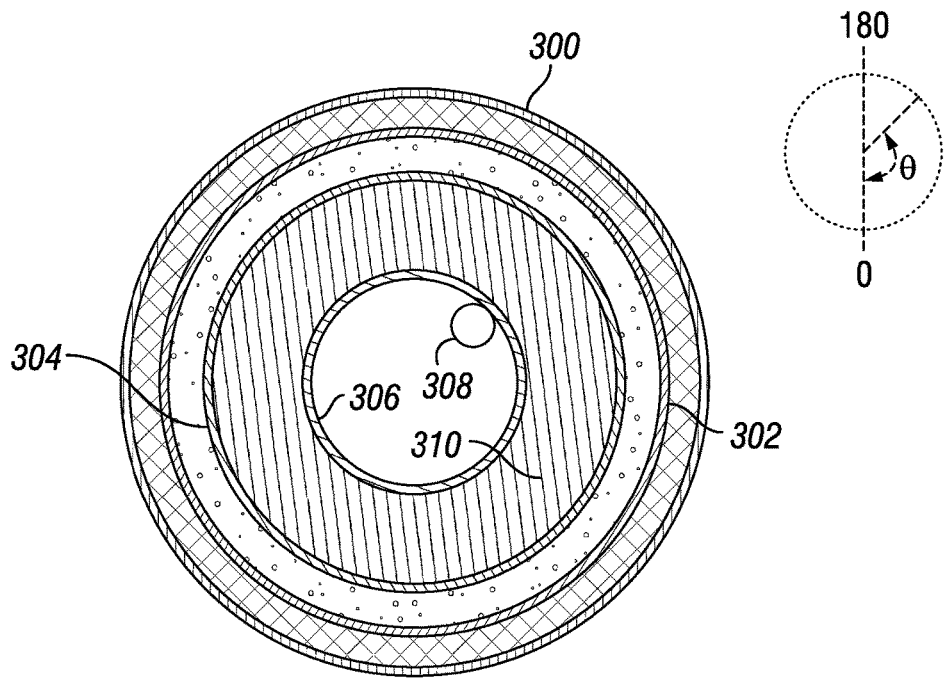

To illustrate, a tool 308 (e.g., an open-hole density tool) is used to obtain measurements of a material in an annulus 310 in both a non-concentric casing arrangement, a cross-section of which is depicted in FIG. 3A, and a concentric casing arrangement, a cross-section of which is depicted in FIG. 3B. In FIGS. 3A and 3B, outer casing 300 surrounds casings 302, 304, and inner casing 306. As shown in FIG. 3A, casings 300, 302, 304, and 306 are arranged non-concentrically and positioned adjacent to and touching one another at an azimuth of 0°. In FIG. 3B, casings 300, 302, 304, and 306 are arranged concentrically and axially centered with respect to each other. Those having ordinary skill in the art would appreciate that although casings 300, 302, 304, and 306 are shown touching at an azimuth of 0° in FIG. 3A, the present disclosure is not so limited. Each of casings 300, 302, 304, and 306 may be positioned adjacent to another casing and/or the borehole wall at any azimuth.

In FIG. 3A, the tool 308 is positioned within and located against a portion of inner casing 306. The tool 308 is used to obtain measurements of the casings, annuluses, and formation surrounding the borehole at different azimuths about the inner casing 306. For example, count rates may be measured by the tool 308 at different azimuths about the inner casing 306. The tool 308 may also be used to obtain measurements of the casings, annuluses, and formation surrounding the borehole at different azimuths about the inner casing 306 of a corresponding concentric casing arrangement, as shown in FIG. 3B. For example, similar to above, count rates may be measured by the tool 308 at different azimuths about the inner casing 306 in a concentric casing arrangement. The measured count rates may then be plotted in order to determine a relationship between non-concentrically arranged casings (FIG. 3A) and concentrically arranged casings (FIG. 3B).

Figure 4A:
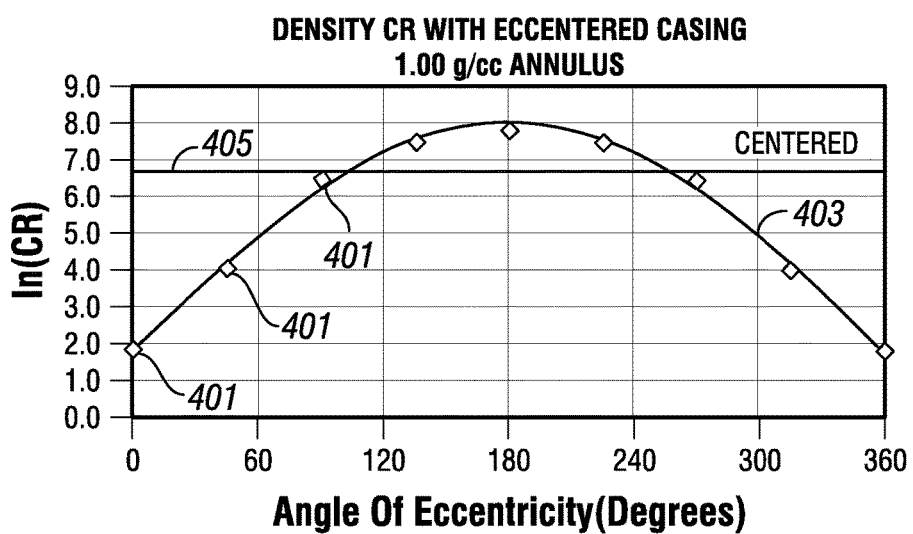
FIGS. 4A and 4B depict graphs of count rates for concentric and non-concentric cased boreholes in accordance with one or more embodiments.

FIG. 4A depicts a graph of the measured count rates when water is used as a test material located in annulus 310. The count rates are plotted as a function of azimuth about the inner casing 306. Data points 401 represent count rates measured at given azimuths in a non-concentric casing arrangement (e.g., the arrangement shown in FIG. 3A). Data points 401 are fit with curve 403. For comparison, line 405 represents the measured count rates for the concentric casing arrangement (e.g., the arrangement shown in FIG. 3B) in which water was also used as a test material located in annulus 310.

As shown in FIG. 4A, measured count rates for the non-concentric casing arrangement differ from the measured count rates in the concentric casing arrangement. To determine a relationship between the non-concentric casing arrangement and the concentric casing arrangement, the intersection of the fit lines of the count rates corresponding to each arrangement may be used. In particular, the intersection between curve 403 and line 405, representing data from the non-concentric casing arrangement and data from the concentric casing arrangement, respectively, may be used to determine the azimuth(s) in which the measured count rates for the non-concentric casing arrangement correspond with the measured count rates for the concentric casing arrangement. In this case, an azimuth of 180±75° of the measured count rates in the non-concentric casing arrangement corresponds with the measure count rates in the concentric casing arrangement. Those having ordinary skill in the art would appreciate that this case is for purposes of example only and any azimuth(s) may be considered without departing from the scope of the present disclosure.

Figure 4B:
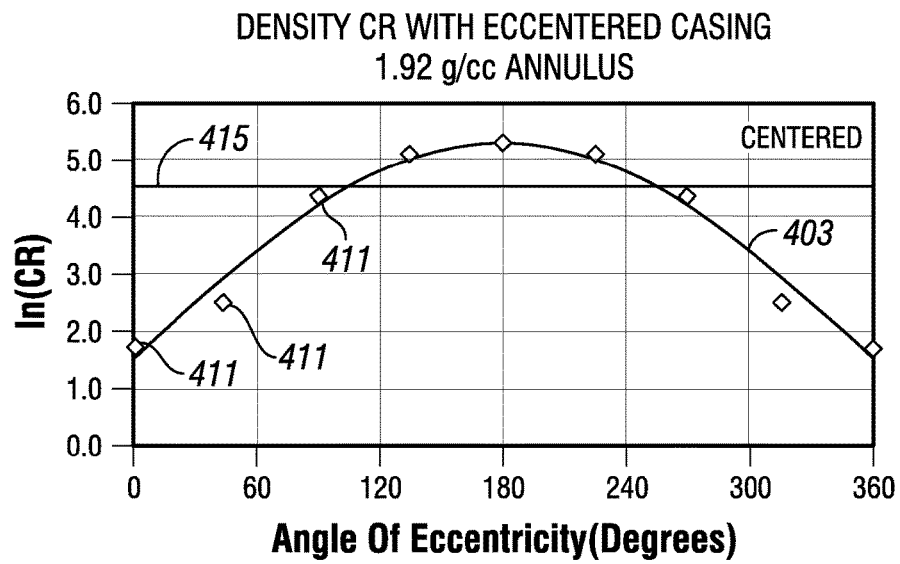

FIG. 4B depicts a graph of the measured count rates when barite mud is used a test material located in annulus 310. The count rates are plotted as a function of azimuth about the inner casing 306. Data points 411 represent count rates measured at given azimuths in a non-concentric casing arrangement (e.g., the arrangement shown in FIG. 3A). Data points 411 are fit with curve 413. For comparison, line 415 represents the measured count rates for the concentric casing arrangement (e.g., the arrangement shown in FIG. 3B) in which barite mud was also used as a test material located in annulus 310.

As shown in FIG. 4B, measured count rates for the non-concentric casing arrangement differ from the measured count rates in the concentric casing arrangement. To determine a relationship between the non-concentric casing arrangement and the concentric casing arrangement, the intersection of the fit lines of the count rates corresponding to each arrangement may be used. In particular, the intersection between curve 413 and line 415, representing data from the non-concentric casing arrangement and data from the concentric casing arrangement, respectively, may be used to determine the azimuth(s) in which the measured count rates for the non-concentric casing arrangement correspond with the measured count rates for the concentric casing arrangement. Similar to above, an azimuth of 180±75° of the measured count rates in the non-concentric casing arrangement corresponds with the measure count rates in the concentric casing arrangement. Those having ordinary skill in the art would appreciate that this case is for purposes of example only and any azimuth(s) may be considered without departing from the scope of the present disclosure.

In FIGS. 4A and 4B, lines 405 and 415 are calculated to fit data points 401 and 411, respectively. In one or more embodiments, lines 405 and 415 may be represented by the equation:

$$\ln(C) = a + b \sin(\theta/2) \quad (3)$$

where C is the count rate, a and b are free parameters, and $\theta$ is azimuth. Based on Equation 3, if the parameters a, b, and $\theta$ are determined, the count rates measured in a non-concentric casing arrangement may be used to determine the measured count rates in a corresponding concentric casing arrangement. Using the azimuths of 180±75° to determine the corresponding concentric casing arrangement count rates, properties of a material in an annulus between two objects in a borehole may be determined.

Figure 5A:
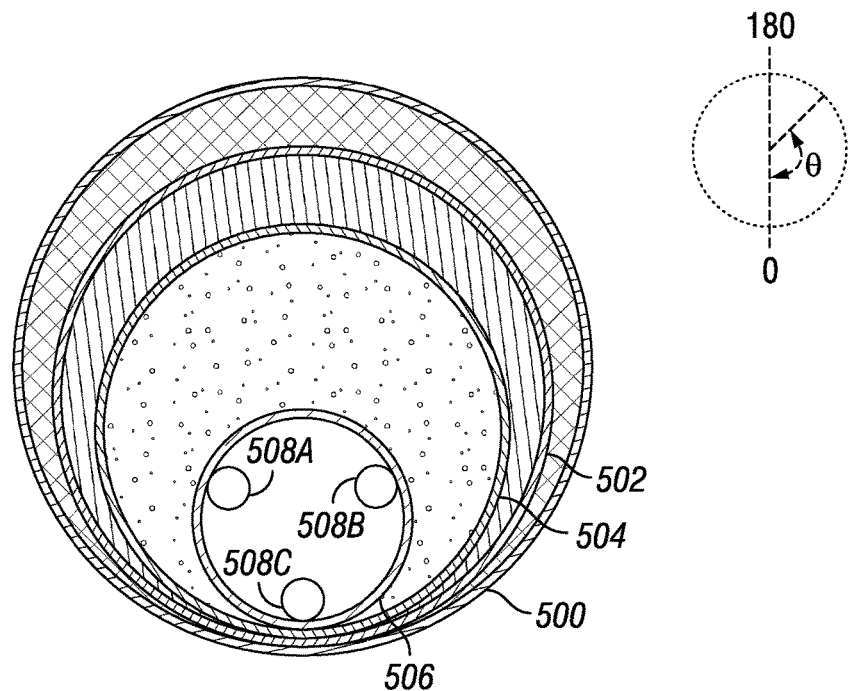
FIGS. 5A and 5B depict logging tools in a borehole in accordance with one or more embodiments.
Figure 5B:
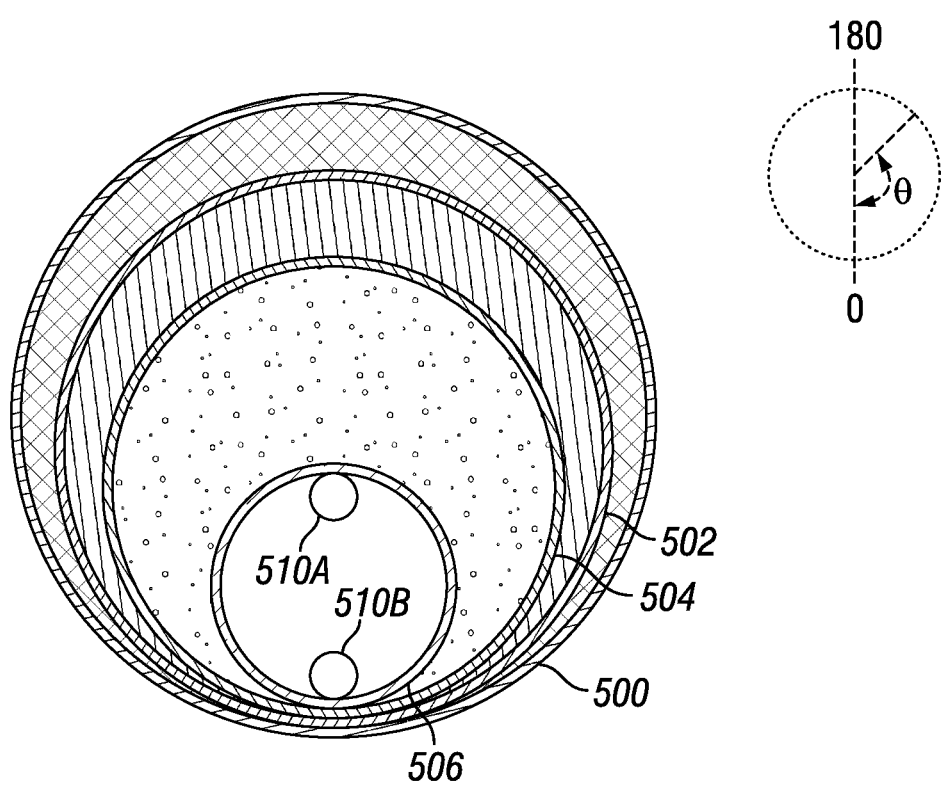

To determine a, b, and $\theta$, three independent measurements may be obtained by logging with one or more logging tools. FIGS. 5A and 5B depict cross-sectional views of one or more logging tools positioned within a non-concentric casing arrangement in accordance with one or more embodiments. In FIGS. 5A and 5B, outer casing 500 surrounds casings 502, 504, and inner casing 506. As shown, casings 500, 502, 504, and 506 are arranged non-concentrically and positioned adjacent to and touching one another at an azimuth of 0°. Those having ordinary skill in the art would appreciate that although casings 500, 502, 504, and 506 are shown touching at an azimuth of 0°, the present disclosure is not so limited. Each of casings 500, 502, 504, and 506 may be positioned adjacent to another casing and/or the borehole wall at any azimuth.

In FIG. 5A, three tools 508A, 508B, and 508C are positioned within inner casing 506. The tools 508A, 508B, and 508C may be oriented at different angles with respect to each other. For example, the tools 508A, 508B, and 508C may be arranged at about 120° with respect to each other, as shown, or may be arranged at any azimuth with respect to each other. The tools 508A, 508B, and 508C are used to obtain measurements of the casings, annuluses, and formation surrounding the borehole at different azimuths about the inner casing 506. For example, count rates may be measured by the tools 508A, 508B, and 508C at different azimuths about the inner casing 506. Those having ordinary skill in the art would appreciate that more than three tools could also be used. For example, 4, 5, 6, more tools may be used and may be separated by given azimuths.

It may also be possible to determine a, b, and θ by obtaining measurements using two logging tools, as shown in FIG. 5B. In FIG. 5B, two logging tools 510A and 510B are positioned within inner casing 506. The tools 510A and 510B may be oriented at different angles with respect to each other. For example, the tools 510A and 510B may be arranged at about 180° with respect to each other, as shown, or may be arranged at any azimuth with respect to each other. The tools 510A and 510B are used to obtain measurements of the casings, annuluses, and formation surrounding the borehole at different azimuths about the inner casing 506. For example, count rates may be measured by the tools 510A and 510B at different azimuths about the inner casing 506.

Using measurements obtained from tools 510A and 510B in a non-concentric casing arrangement, as shown in FIG. 5B, an approximation of a concentric casing arrangement may be determined. One method of approximation may be referred to as spine-and-ribs processing, developed for open-hole density logging, as will be discussed in detail below.

Figure 6A:
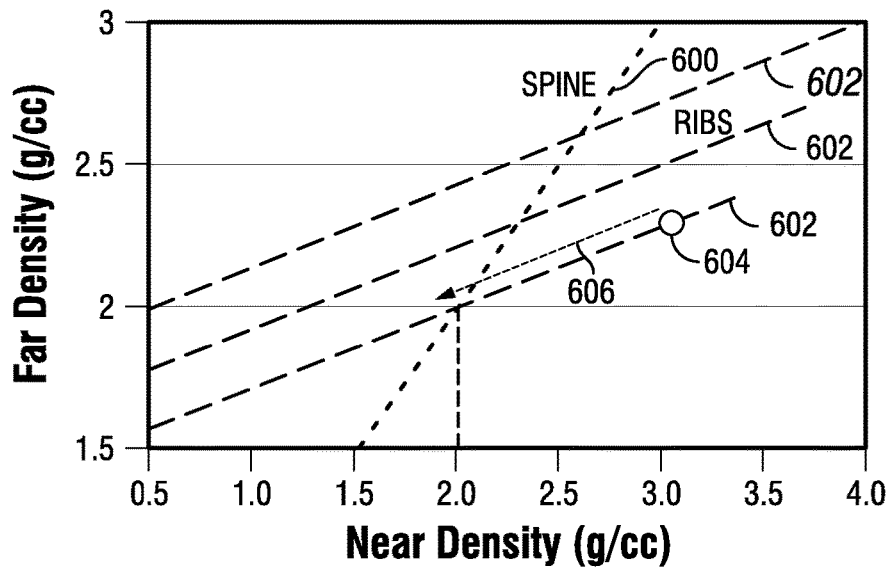
FIGS. 6A-6D depict graphs of a spine-and-ribs approximation in accordance with one or more embodiments.

FIGS. 6A-6D depict graphs of a spine-and-ribs approximation technique in accordance with one or more embodiments. In FIG. 6A, a spine 600 and ribs 602 based on measurements from two detectors in a tool are shown. In this example, count rates for each of two detectors (e.g., a near detector and a far detector) of the tool in a borehole are measured. The count rates are then used to determine a property of the material (e.g., density) in the formation. As will be appreciated, other properties may be determined without departing from the scope of the present disclosure.

In a hypothetical open-hole scenario, where material (e.g., mudcake) does not reside between the tool and the borehole wall and where there is no standoff (material designed to position a tool a specific distance away from the borehole wall), data obtained by near and far detectors would plot along spine 600. If there is standoff or if some material exists between the tool and the borehole wall during logging, data obtained by the near and far detectors would plot off the spine 600. In one or more embodiments, data obtained in this case may plot along one of the ribs 602.

When there is standoff or when some material exists between the tool and the borehole wall during logging, a corrected density may be determined by projecting one or more data points back to the spine 600 following a path parallel to the ribs 602. In the example of FIG. 6A, one such data point 604 is shown plotted off spine 600 and along one of ribs 602. The data point 604 has a near density of 3.05 g/cc and a far density of 2.30 g/cc. Projecting the data point 604 back to spine 600, as indicated by arrow 606, results in a corrected density of 2.0 g/cc.

Figure 6B:
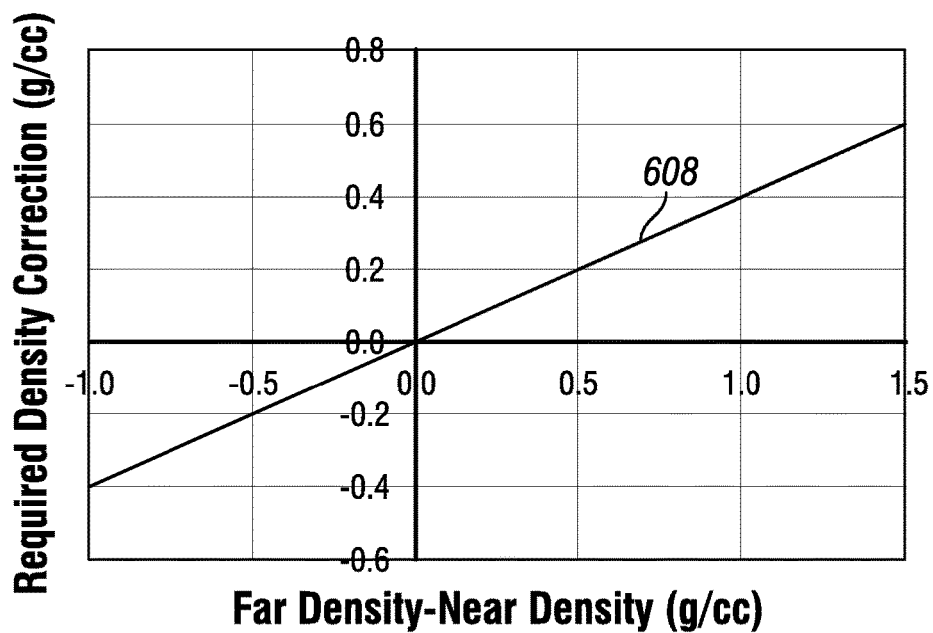

Using this type of spine-and-ribs processing, the difference between two densities (such as a near density determined based upon data from a near detector and a far density determined based up data from a far detector, as discussed above) may be mapped to a correction term. The correction term may then be added to the far detector density in order to determine the corrected density. Mapping may be performed by plotting the correction term for the far detector (i.e., the value added to the density determined using measurements from the far detector to obtain the corrected density) against the difference between the far detector density and the near detector density, as shown in FIG. 6B. In this example, the data points plot along a straight line 608.

Spine-and-ribs processing may also be applied to data obtain while logging using two tools in a borehole (e.g., FIG. 5B). In one or more embodiments, the two tools may be oriented at different angles with respect to each other and/or may be separated by a predetermined azimuth. The two tools may also be separated axially (e.g., one tool may be positioned above the other tool in a borehole). The borehole may include an annulus between two casings or an annulus between a casing and a wall of the borehole. As will be appreciated, other arrangements and tool positions may be considered without departing from the scope of the present disclosure.

Figure 6C:
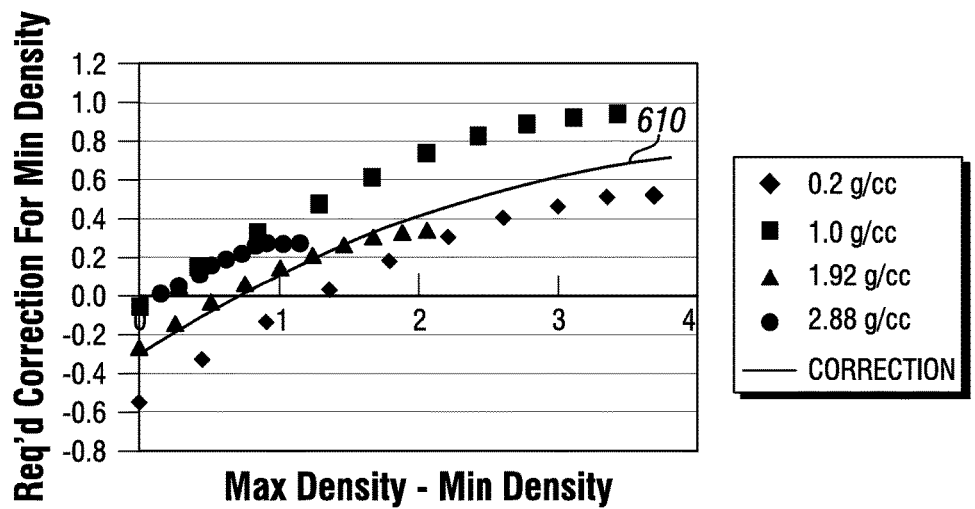

The near density measurement and far density measurement may be replaced by density obtained using measurements from detectors in different tools. For example, a first density may be obtained using measurements from a detector of a first tool, while a second density may be obtained using measurements from a detector of a second tool. In this and other embodiments, instead of using near and far densities, as described above, maximum and minimum densities obtained using measurements from the first and second tools may be used. For example, as shown in FIG. 6C, the correction term for minimum density (i.e., the value added to the minimum of the density determined using measurements from the first tool and the density determined using measurements from the second tool to obtain a corrected density) is plotted against the difference between the maximum and minimum density determined by measurements obtained by each of the first tool and the second tool. As shown in FIG. 6C, several different densities in an annulus were measured and plotted. As the measurements do not fall along a single line, an average of the measurements may be used as the correction term, represented by curve 610.

Figure 6D:
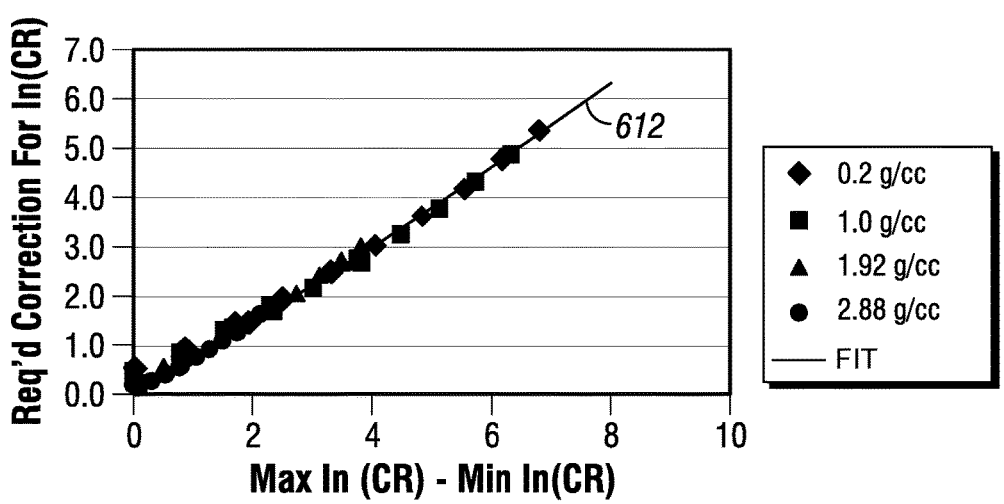

In one or more embodiments, spine-and-ribs processing may be applied using count rates, as opposed to material properties such as density, as discussed above. For example, as shown in FIG. 6D, similar to FIG. 6C, the correction term for logarithm of the minimum count rate (i.e., the value added to the minimum of the logarithm of the count rate determined using measurements from the first tool and the logarithm of the count rate determined using measurements from the second tool to obtain a corrected count rate) is plotted against the difference between the logarithm of the maximum count rate and the logarithm of the minimum count rate determined by measurements obtained by each of the first tool and the second tool. As shown in FIG. 6D, several different densities in an annulus were measured and plotted and an average of the measurements is shown and may be used as the correction term, represented by curve 612.

Figure 7:
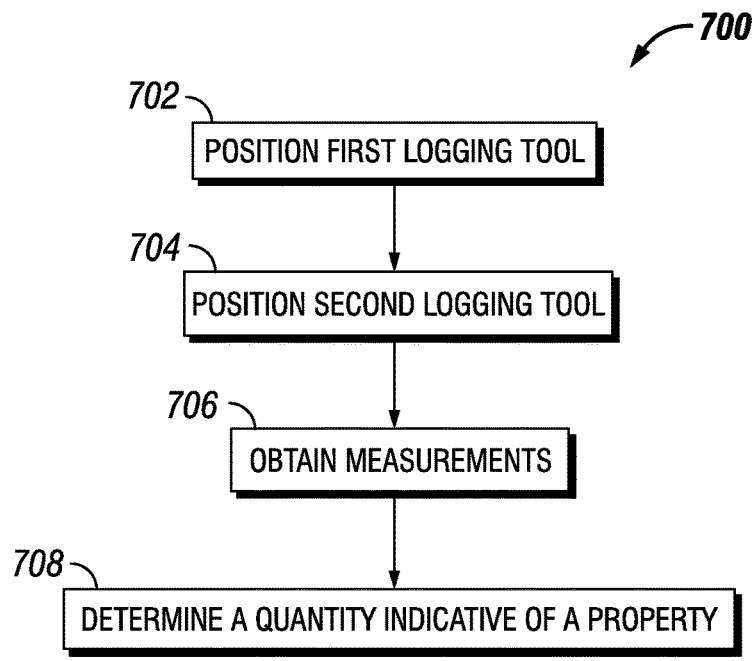
FIG. 7 depicts a flowchart of a method for determining a property in a borehole in accordance with one or more embodiments.

FIG. 7 depicts a flowchart of a method 700 for determining a property of a material in an annulus between two objects disposed in a borehole in accordance with one or more embodiments. The annulus may be between two casings or between a casing and the borehole wall. The method includes positioning or placing a first logging tool in a borehole at 702 and positioning or placing a second logging tool in a borehole at 704. The first logging tool and the second logging tool are oriented at an angle with respect to one another. For example, the first logging tool may be oriented 180° apart from the second logging tool. The logging tool may be any downhole tool known in the art. For example, the logging tool may include an open-hole density tool or other tools such as pulsed or compensated neutron tools, gamma ray tools, spontaneous potential tools, resistivity tools, and induction tools, among many others, may be used without departing from the scope of the present disclosure.

The first and second logging tools may be located in an inner casing of a cased borehole. The cased borehole may include multiple casings in a concentric arrangement, a non-concentric arrangement, or combinations of both. For example, at a particular location along the borehole, the casings may be concentric, while at a different location along the borehole, the casings may be non-concentric.

In one or more embodiments, the first and second logging tools may each include a number of sources and detectors. Using one or more of the sources and detectors, the first and second logging tools may perform and obtain measurements at 706 of a region surrounding the tools. For example, count rates corresponding to different ranges of energy received in a detector by gamma rays may be measured using the tools. Measurements may include gamma ray count rate, density, and ratios of count rates, among others. The measurements may then be used to determine one or more properties of a material at 708, such as a property that is dependent on a type of material residing in an annulus between casings or an annulus between a casing and the borehole in the borehole. Properties may include composition (e.g., chemical composition), density, viscosity, pH, porosity, permeability, and alkalinity.

As an example, the measurements may be used to determine an estimate of a high-energy count rate that would be measured if the casings were concentric. The logarithm of such a count rate may scale with the density of the material in the annulus between two objects disposed in the borehole. Observation of the logarithm of the count rate at various depths would allow density transitions or changes to be observed. The transitions or changes may be used with other measurements made in the borehole to identify the one or more materials in the annulus at various depths of the borehole. In other embodiments, the quantity may be computed from the aforementioned count rate using a function that correlates count rates to annular density for the casing geometry used in a borehole in order to directly obtain the annular density.

In one or more embodiments, a third or more logging tools may be positioned in an inner casing of a borehole. The logging tools may be arranged at even intervals about the azimuth of the cased borehole (as shown in FIG. 5A). For example, if three logging tools are disposed in the borehole, the logging tools may be arranged with 120° intervals between each other or at 120° with respect to each other.

If the casing arrangement is non-concentric, measurements may be obtained and, based on the obtained measurements, corresponding measurements for a concentric arrangement may be determined. The concentric arrangement measurements may then be used to determine one or more properties of material in one or more annuluses in the borehole.

Figure 8:
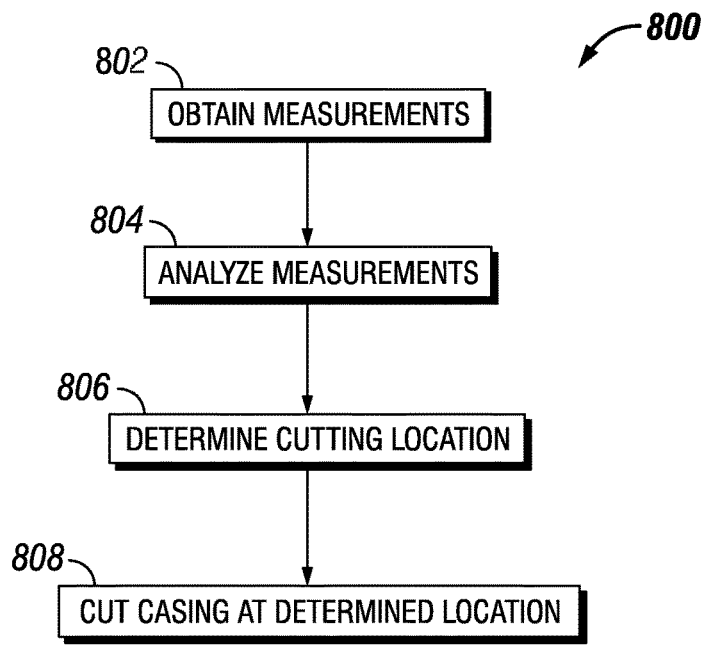
FIG. 8 depicts a flowchart of a method for determining a location to cut casing in a borehole in accordance with one or more embodiments.

FIG. 8 depicts a method 800 for determining a location to cut casing in a borehole in accordance with one or more embodiments. The method 800 includes obtaining measurements from two or more logging tools at 802. Similar to the above, the logging tools may include one or more sources and detectors. The logging tools may perform and obtain measurements of a region surrounding the tools. Measurements may include gamma ray count rate, density, and ratios of count rates from different ranges of detected energies, among others.

After measurements are obtained, the measurements may be analyzed in 804 to determine one or more properties of a material in an annulus between two objects disposed in the borehole. The property may include composition (e.g., chemical composition), density, viscosity, pH, porosity, permeability, and alkalinity. The property may be of a material located between two or more casings in a borehole or between a casing and a borehole wall.

In one or more embodiments, based on the property, a location in which to cut one or more casings strings may be determined in 806. For example, as pulling rig capabilities are limited, the location in which to cut one or more casing strings may depend on one or more materials between annuluses in a cased borehole. In addition, friction forces may be determined based on the material(s) between annuluses in the borehole. At 808, the casing may be cut and pulled out of the borehole.

In accordance with embodiments of the present disclosure, more accurate analyses of non-concentric cased boreholes may be possible by utilizing two or more logging tools. In addition, when cutting and pulling casing during well abandonment, more efficient calculations of the location to cut casing may be performed. As a result, time for completing the well abandonment processes may be saved, costs may be reduced, and the overall well abandonment process may be more efficiently performed.

In addition to the embodiments described above, many examples of specific combinations are within the scope of the disclosure, some of which are detailed below:

Example 1

A method for determining a material in an annulus between two objects disposed in a borehole, the method comprising positioning logging tools in the borehole, each of the logging tools being oriented at a different angle, measuring a property of the material in the annulus using the logging tools, and determining the material in the annulus based on the measured property.

Example 2

The method of Example 1, wherein at least one of the logging tools comprises an open-hole density tool.

Example 3

The method of Example 1, wherein the logging tools comprise three logging tools oriented about 120° with respect to each other.

Example 4

The method of Example 1, wherein at least two of the logging tools are oriented about 180° with respect to each other.

Example 5

The method of Example 1, wherein measuring a property comprises measuring count rates from two or more of the logging tools.

Example 6

The method of Example 5, wherein determining the material further comprises combining the count rates from the two or more logging tools to obtain one or more count rates indicative of concentric casings.

Example 7

The method of Example 6, wherein the one or more count rates indicative of concentric casings are mapped to a property of a material.

Example 8

The method of Example 1, wherein measuring the property comprises: measuring higher-energy count rates from two or more of the logging tools, and measuring lower-energy count rates from two or more of the logging tools, and determining the material comprises combining the higher-energy count rates and the lower-energy count rates to determine an indicator of the material.

Example 9

The method of Example 1, wherein the property of the material comprises at least one of composition, density, viscosity, pH, porosity, permeability, and alkalinity.

Example 10

The method of Example 1, wherein the two objects are either a casing and the formation or two casings.

Example 11

The method of Example 1, wherein at least a portion of the borehole comprises multiple casings arranged non-concentrically.

Example 12

The method of Example 1, wherein the thickness of the annulus varies longitudinally along a length of the borehole.

Example 13

The method of Example 1, wherein at least a portion of the borehole comprises multiple casings arranged concentrically.

Example 14

A method for determining a location to cut casing in a borehole, the method comprising measuring a property of a material in an annulus between two objects disposed in the borehole, determining the material in the annulus based on the measured property, and determining the location to cut the casing based on the determined material.

Example 15

The method of Example 14, wherein measuring the property comprises obtaining measurements using logging tools located within the borehole, each of the logging tools oriented at different angles.

Example 16

The method of Example 14, wherein the borehole comprises multiple casings arranged non-concentrically.

Example 17

The method of Example 14, wherein measuring the property comprises measuring higher-energy count rates from two or more of the logging tools, and measuring lower-energy count rates from two or more of the logging tools, and determining a property measurement comprises combining the higher-energy count rates and the lower-energy count rates to determine an indicator of the material.

Example 18

The method of Example 14, wherein at least one of the logging tools comprises an open-hole density tool.

Example 19

The method of Example 14, wherein determining the location to cut comprises calculating friction forces based on the determined material.

Example 20

The method of Example 19, wherein determining the location to cut is based upon pulling rig capabilities.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method for determining a material in an annulus between two objects disposed in a borehole, the method comprising:
    positioning logging tools in the borehole, each of the logging tools being oriented at a specified different azimuthal angle;
    measuring a count rate for each logging tool indicative of a property of the material in the annulus, using the logging tools;
    determining a difference between the count rates for each logging tool;
    determining a property of the material in the annulus based on the difference between the count rates; and
    determining the material in the annulus based on the measured property.

2. The method of claim 1, wherein at least one of the logging tools comprises a density tool.

3. The method of claim 1, wherein the logging tools comprise three logging tools oriented about 120° with respect to each other.

4. The method of claim 1, wherein at least two of the logging tools are oriented about 180° with respect to each other.

5. The method of claim 1, wherein measuring a property comprises measuring count rates from two or more of the logging tools.

6. The method of claim 5, wherein determining the material further comprises mapping the count rates from the two or more logging tools to one or more count rates indicative of concentric casings.

7. The method of claim 6, wherein the one or more count rates indicative of concentric casings are mapped to the property of the material.

8. The method of claim 1, wherein measuring the property comprises:
    measuring higher-energy count rates from two or more of the logging tools;
    measuring lower-energy count rates from two or more of the logging tools; and
    wherein determining the material comprises combining the higher-energy count rates and the lower-energy count rates to determine an indicator of the material.

9. The method of claim 1, wherein the property of the material comprises at least one of composition, density, viscosity, pH, porosity, permeability, and alkalinity.

10. The method of claim 1, wherein the two objects are either a casing and the formation or two casings.

11. The method of claim 1, wherein at least a portion of the borehole comprises multiple casings arranged non-concentrically.

12. The method of claim 1, wherein the thickness of the annulus varies longitudinally along a length of the borehole.

13. The method of claim 1, wherein at least a portion of the borehole comprises multiple casings arranged concentrically.

14. A method for determining a location to cut casing in a borehole, the method comprising:
    measuring, with at least two logging tools oriented at specified azimuthal angles, a count rate for each logging tool indicative of a property of a material in an annulus between two objects disposed in the borehole;
    determining a difference between the count rates for each logging tool;
    determining a property of the material in the annulus based on the difference between the count rates;
    determining the material in the annulus based on the measured property; and
    determining the location to cut the casing based on the determined material.

15. The method of claim 14, wherein the borehole comprises multiple casings arranged non-concentrically.

16. The method of claim 14, wherein:
    measuring the property comprises:
        measuring higher-energy count rates from the two or more logging tools; and
        measuring lower-energy count rates from two or more of the logging tools; and
        determining a property measurement comprises combining the higher-energy count rates and the lower-energy count rates to determine an indicator of the material.

17. The method of claim 14, wherein at least one of the logging tools comprises an open-hole density tool.

18. The method of claim 14, wherein determining the location to cut comprises calculating friction forces based on the determined material.

19. The method of claim 18, wherein determining the location to cut is based upon pulling rig capabilities.

* * * * *